United States Patent
Yotsumoto

(10) Patent No.: US 8,014,790 B2
(45) Date of Patent: Sep. 6, 2011

(54) BASE STATION DEVICE FOR SETTING UP THE ACCESS RIGHTS FOR USER TERMINALS IN RESPONSE TO USER ACTUATION OF SWITCHES OR BUTTONS

(75) Inventor: Koji Yotsumoto, Machida (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 467 days.

(21) Appl. No.: 12/199,636

(22) Filed: Aug. 27, 2008

(65) Prior Publication Data

US 2009/0069036 A1 Mar. 12, 2009

(30) Foreign Application Priority Data

Aug. 28, 2007 (JP) ................................. 2007-221498

(51) Int. Cl.
*H04W 88/02* (2009.01)
(52) U.S. Cl. .................................................. 455/456.1
(58) Field of Classification Search ............... 455/456.1, 455/466; 370/328, 331, 338, 408
See application file for complete search history.

(56) References Cited

U.S. PATENT DOCUMENTS

2008/0031159 A1 * 2/2008 Jokinen .......................... 370/255

FOREIGN PATENT DOCUMENTS

JP  10-340231  12/1998

* cited by examiner

*Primary Examiner* — Diane Mizrahi
(74) *Attorney, Agent, or Firm* — Brundidge & Stanger, P.C.

(57) ABSTRACT

The uplink signal circuitry of the base station device includes an authenticating unit, an access right setup unit, and a changeover switch for changeover between the setup of the access right and the authentication process. When a user performs the operation of setting up the right to access to the base station device, the changeover switch is flipped to select the access right setup unit. The access right setup unit executes authentication process on the basis of the IMSI (code unique to user terminal) sent from the user terminal. If the result of authentication is successful, the IMSI of the user terminal is registered in the authentication memory. Thereafter, the changeover switch is flipped to select the authenticating unit to authenticate the user terminal on the basis of the IMSI of the user terminal registered in the authentication memory. The authenticated user terminal is then connected with an upper device.

5 Claims, 6 Drawing Sheets

BASE STATION DEVICE FOR SETTING UP THE ACCESS RIGHTS FOR USER TERMINALS IN RESPONSE TO USER ACTUATION OF SWITCHES OR BUTTONS

INCORPORATION BY REFERENCE

The present application claims priority from Japanese applications JP 2007-221498 filed on Aug. 28, 2007, and the content of which is hereby incorporated by reference into this application.

BACKGROUND OF THE INVENTION

This invention relates to a base station device for use at home in a mobile communication system.

In the conventional mobile communication system, access from a mobilephone, which is an example of a mobile unit, to the network system has been normally made through the network authentication protocol used in the higher hierarchy higher than that of the base station, on the basis of the subscriber information (user information) stored in the HSS (home subscriber server) which is installed in the core network belonging to the company that provides the mobilephone service. Accordingly, the function of setting the right to access of the mobilephone to the network system has not been provided in the base station for the mobilephone.

FIG. 5 shows in block diagram the system configuration of a network for the third generation mobilephone system that is now under way.

In FIG. 5, when initiating communication in, for example, voice, a user terminal (or UE: User Equipment) 11 such as a mobilephone makes radio access to a BTS (base transceiver station) 12 which is within radio link to the user terminal 11. The BTS 12 is connected via a transmission line 13 with an RNC (radio network controller) 14 as an upper device. The RNC 14 has the function of controlling the wireless layer and is connected via a transmission line 15 with a core network 20.

The core network 20 comprises, for example, an MSC (mobile switch center) 21 for controlling the radio link to the user terminals 11 registered in the network to which the core network 20 belongs; a visitor location register 22 for registering the current location of any specified user terminal 11; an HSS (home subscriber server) 23 for storing the subscriber information for respective user terminals 11; and a GMSC (gateway mobile switching center) 24 for controlling the connection to other networks to which the core network 20 does not belong.

In such a network system as described just above, when a user terminal 11 accesses the associated BTS 12, the information on the user terminal 11 is sent to the core network 20 via the RNC 14. The core network 20 makes, through network authentication protocol, the authentication of the accessing user terminal 11 on the basis of the subscriber information stored in the HSS 23. When the user terminal 11, or user itself, is identified, the information on the location of the user or the terminal 11, and the subscriber information are delivered to the visitor location register 22 and registered therein.

As described above, in the conventional network system, the right to access of the user terminal 11 to the network system has been set up on the basis of the subscriber information stored in the HSS 23 belonging to the core network 20, and the BTS 12 has not been provided with the function of setting up the access right.

A publicly known technique, which relates to this invention, is disclosed in, for example, JP-A-10-340231. According to JP-A-10-340231, in case where a single IC card is to administer plural data such as cash cards, credit cards, self IDs, and commuter tickets, a separate memory for storing data of high secrecy is provided in the IC card. Authentication process is performed for the access demands from the reader/writer for which the right to access to the separate memory is set up. Thus, access is permitted only after the authentication process has been properly completed.

Recently, there were discussions about the provision of base stations for home use in the houses of the subscribers to the network system. The provision of such home use base stations aims to realize the subscribers' accesses to specific users at specific locations. In this case, however, it is presupposed that the number of the subscribers is small. With such a base station for small-scale home use, as shown in, for example, FIG. 6, a problem may arise that users who are other than the intended user and located within radio link to the home use base station may saturate the access handling capacity of the base station so that the intended user fails to access the base station.

FIG. 6 illustrates a case where plural user terminals other than the intended user terminal access the base station for small-scale home use. In FIG. 6 is shown the house 31 of a subscriber to a network system, in which a base station 32 for small-scale home use is installed. A user terminal 11a is originally intended to access the base station 32 while other user terminals 11b, 11c . . . are other than the originally intended user terminal 11a and located within radio link to the base station 32.

As shown in FIG. 6, in the case where the user terminals 11b, 11c . . . other than the intended user terminal 11a are located near the base station 32, when the unintended user terminals 11b, 11c . . . start accessing the base station 32 at the same time, the access handling capacity of the base station 32 may be saturated so that the intended user terminal 11a fails to access the base station 32.

As described above, in the conventional network system, the right to access of the user terminal 11 to the network is set up in the hierarchy higher than that of the base station 12, and the function of setting up the access right is not provided in the base station 12 (32). Accordingly, the base station 32 for a small-scale home use cannot reject the access demands from the unintended user terminals so that the accesses of the unintended user terminals to the base station cause the access of the intended user terminal to the base station to fail.

SUMMARY OF THE INVENTION

This invention, which has been made to solve the above described problems, aims to provide a base station device for home use which can set up the right to access of any user terminal to the network and therefore which can reject the access demands from the unintended user terminals so that only the intended user terminals can access the base station.

A base station device according to a first invention features the provision of the function of setting up the access right for user terminals.

A base station device according to a second invention features the provision of the function of setting up the access right for user terminals and the initiation of the process for setting up the access right in response to the actuation by the user of the button or the switch provided on the casing of the base station device.

A base station device according to a third invention features the reduction of reception sensitivity or the setting of reception threshold higher in response to the actuation by the user of the button or the switch provided on the casing of the base station device according to the second invention.

According to this invention, the base station device can set up the right to access of any user terminal to the network and therefore can reject the access demands from the unintended user terminals so that only the intended user terminals can access the base station device. Thus, the base station device has a great advantage in being used as a base station for a small-scale home use which only a limited number of users can use.

The control of the reception sensitivity in response to the actuation by the user of the button or the switch provided on the casing of the base station device enables the creation of wireless environment where only those user terminals which are located near the base station device can communicate with the base station device so that only the intended user terminal is registered. Further, such control also serves to avoid the erroneous authentication of unregistered, unintended user terminals when they attempt to access the base station device.

The other objects and methods of achieving the objects will be readily understood in conjunction with the description of embodiments of the present invention and the drawings.

DETAILED DESCRIPTION OF THE EMBODIMENTS

An embodiment in practice of this invention will be described below with reference to the attached drawings.

Figure 1:
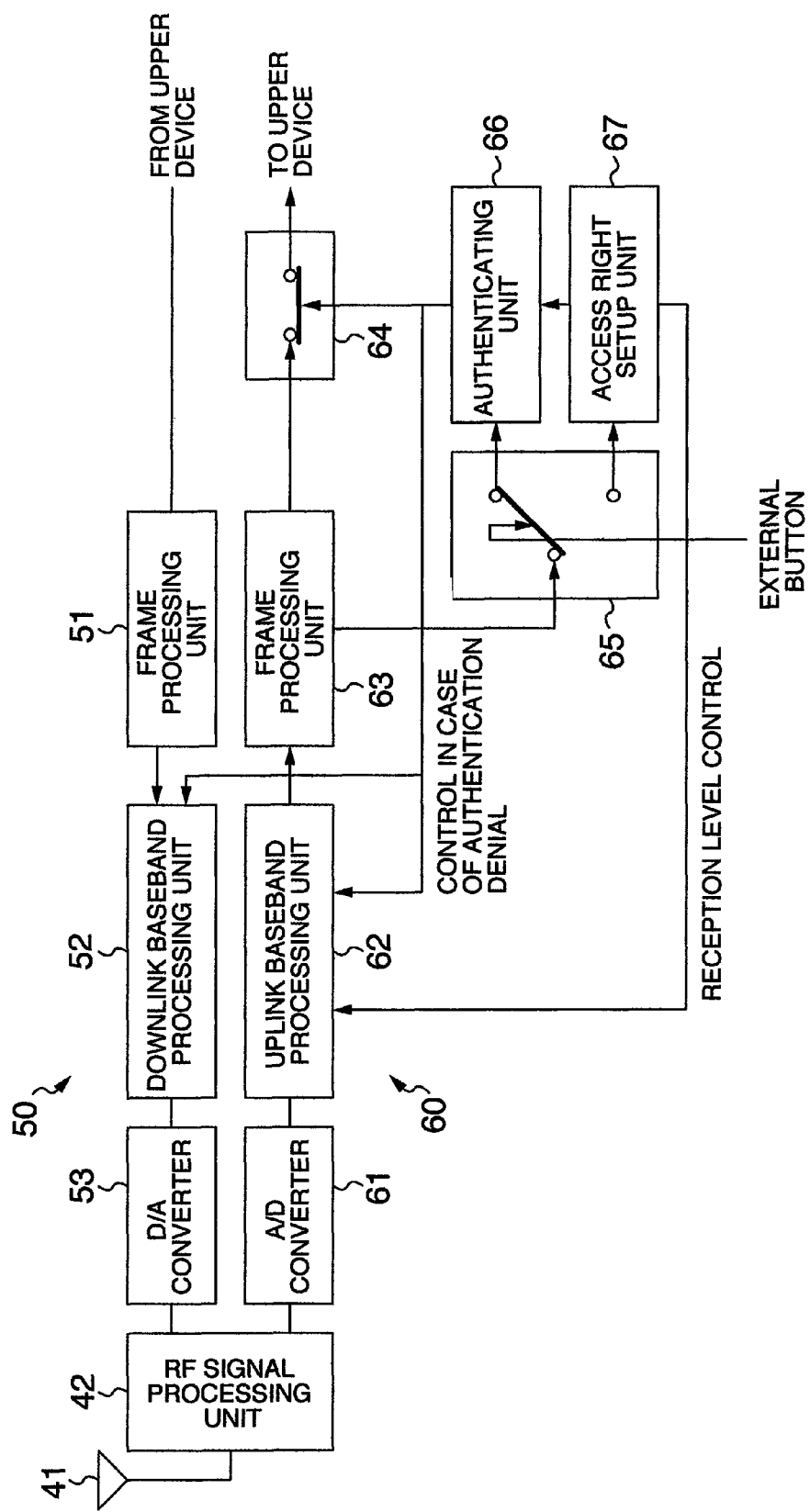
FIG. 1 shows in block diagram the configuration of a base station device as an embodiment in practice of this invention.

FIG. 1 shows in block diagram the configuration of a base station (device) as an embodiment in practice of this invention. In FIG. 1, an antenna 41 for transmission and reception is installed in the base station and connected with an RF (radio frequency) signal processing unit 42. The RF signal processing unit 42 performs radio communication with mobilephones such as user terminals via the antenna 41.

The RF signal processing unit 42 is connected with both a downlink signal circuitry 50 and an uplink signal circuitry 60.

Figure 5:
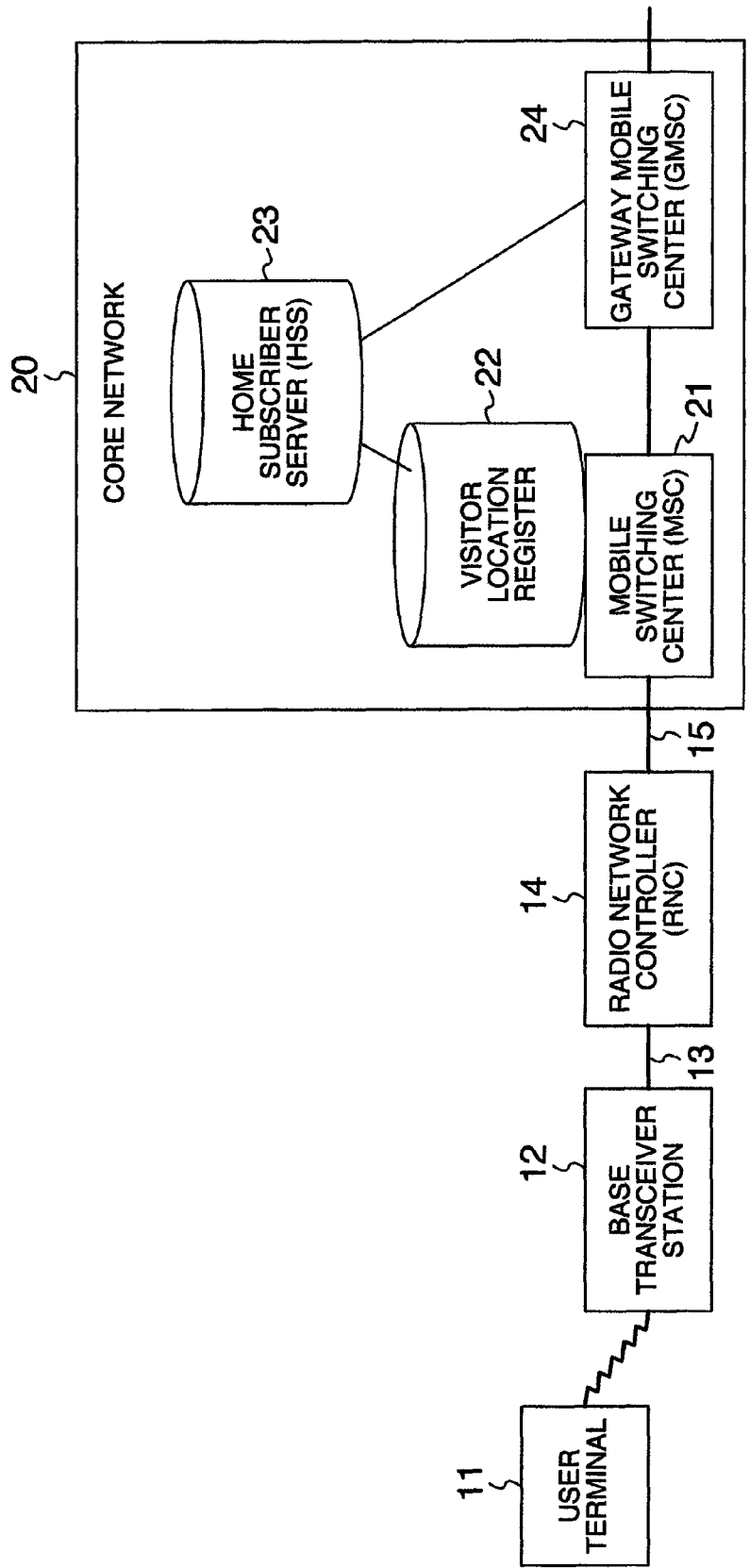
FIG. 5 shows in block diagram the system configuration of a network for the third generation mobilephone system.
Figure 6:
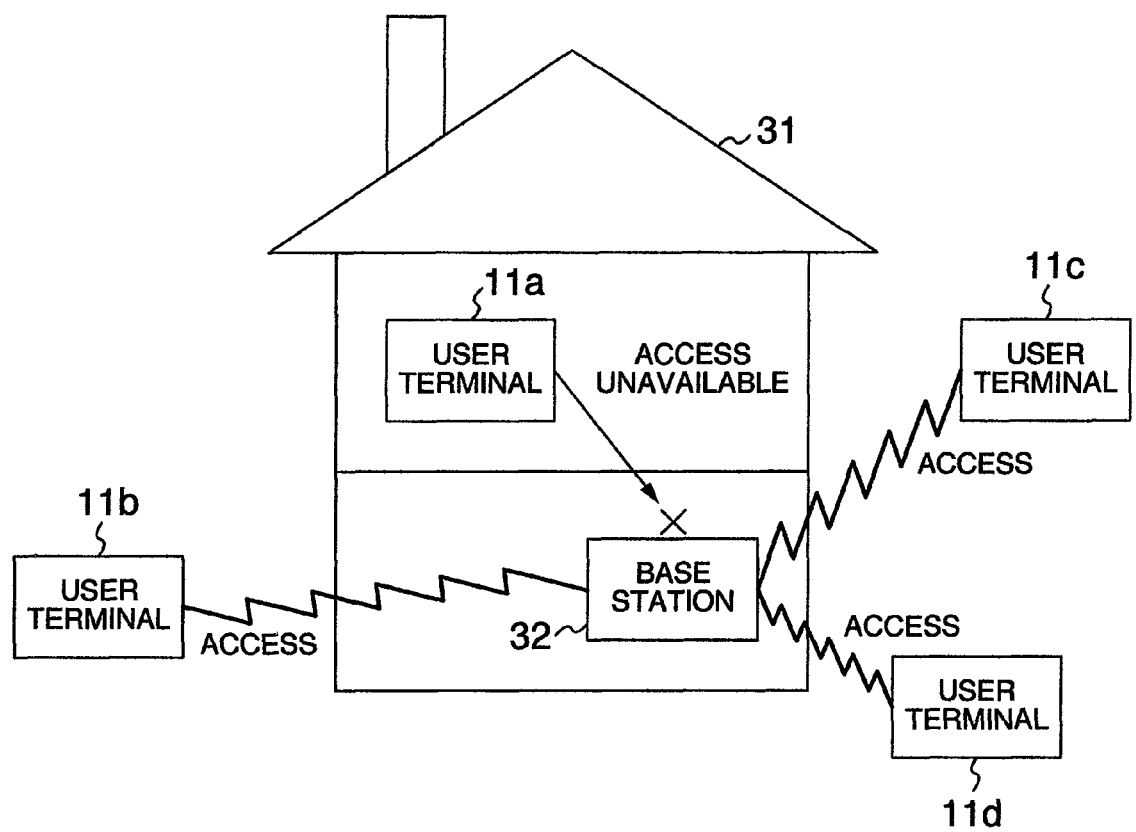
FIG. 6 illustrates a case where plural user terminals access the conventional base station for small-scale home use.

The downlink signal circuitry 50 consists mainly of a frame processing unit 51 for processing into frames the downlink signal sent from the upper device, that is, the RNC (radio network controller) 14 shown in FIG. 5; a downlink baseband processing unit 52 for modulating the framed signals and for adding parity bits for error correction to the framed signals; and a D/A converter 53 for converting the output of the downlink baseband processing unit 52, i.e. digital signal, to analog signal and for delivering the analog signal to the RF signal processing unit 42.

On the other hand, the uplink signal circuitry 60 consists mainly of an A/D converter 61 for converting the output of the RF signal processing unit 42 into digital signal, the output of the RF signal processing unit 42 being the reception-processed version of the signal transmitted from a user terminal and received at the antenna 41; an uplink baseband processing unit 62 for demodulating the output of the A/D converter 61, i.e. digital signal, and for performing error correction on the digital signal delivered from the A/D converter 61; a frame processing unit 63 for de-framing (or de-assembling) the framed output of the uplink baseband processing unit 62, which is originally the data received from the user terminal; and an upper device connection switch 64 for turning on and off the signal sent out from the frame processing unit 63 to the upper device in accordance with the result of authentication.

The uplink signal circuitry 60 further includes an authenticating unit 66 for authenticating user terminals, an access right setup unit 67 for setting up the right (privilege) to access of a user terminal to the base station, and a changeover switch 65 for selectively supply a portion of the data processed by the frame processing unit 63 to the authentication unit 66 or the access right setup unit 67. The changeover switch 65 may be so configured as to be switched over by actuating, for example, a registration button provided on the casing of the base station. Further, in a preferred example, the changeover switch 65 may normally select the authentication unit 66 and be flipped to select the access right setup unit 67 when the registration button is depressed. The changeover switch 65 may continue to select the access right setup unit 67 while the registration button is being depressed, and it may resume selecting the authentication unit 66 when the registration button is released.

The frame processing unit 63 has the function of judging whether the received data are data for authentication or data for access right setting when processing the received data. According as the received data are for authentication or for access right setting, they are sent to the authentication unit 66 or the access right setup unit 67 by means of the changeover switch 65.

The access right setup unit 67 works as follows so as to prevent unregistered, i.e. unintended, user terminals from being erroneously authenticated when they accessed at the time of registering the access right of an intended user terminal. Namely, when an intended user depresses the registration button so as to be registered, the access right setup unit 67 controls the uplink baseband processing unit 62 so as to decrease the reception sensitivity or to increase the receiving threshold at the base station so that the communication environment can be set up where only user terminals located near the base station can communicate with the base station, that is, only an intended user can be securely registered.

The authentication unit 66, when a user terminal accesses the base station, checks through authentication process whether or not the accessing user terminal has access right. If the accessing user terminal has access right, the authentication unit 66 turns on the switch 64 for connection with the upper device so that the connection with the upper device is permitted to cause the normal protocol process to ensue. If the accessing user terminal does not have access right, the authentication unit 66 turns off the switch 64 for connection with the upper device and controls both the downlink and uplink baseband processing units 52 and 62 so that the connection with the upper device may not be performed.

The process of setting up (i.e. registering) the access right at the base station will now be described with reference to a flow chart shown in FIG. 2.

When a user wants to set up the right to access of his/her terminal to the associated base station, the user depresses the registration button provided on the casing of the base station (Step A1). In response to the depression of registration button, the change over switch 65 is flipped from the authentication unit 66 to the access right setup unit 67 so that the mode of setting up the access right is entered into (Step A2). In this mode, the access right setup unit 67 controls the uplink baseband processing unit 62 so as to decrease the reception sensitivity or to increase the receiving threshold at the base station so that the communication environment can be set up where only user terminals located near the base station can communicate with the base station, that is, only an intended user can be securely registered.

Figure 4:
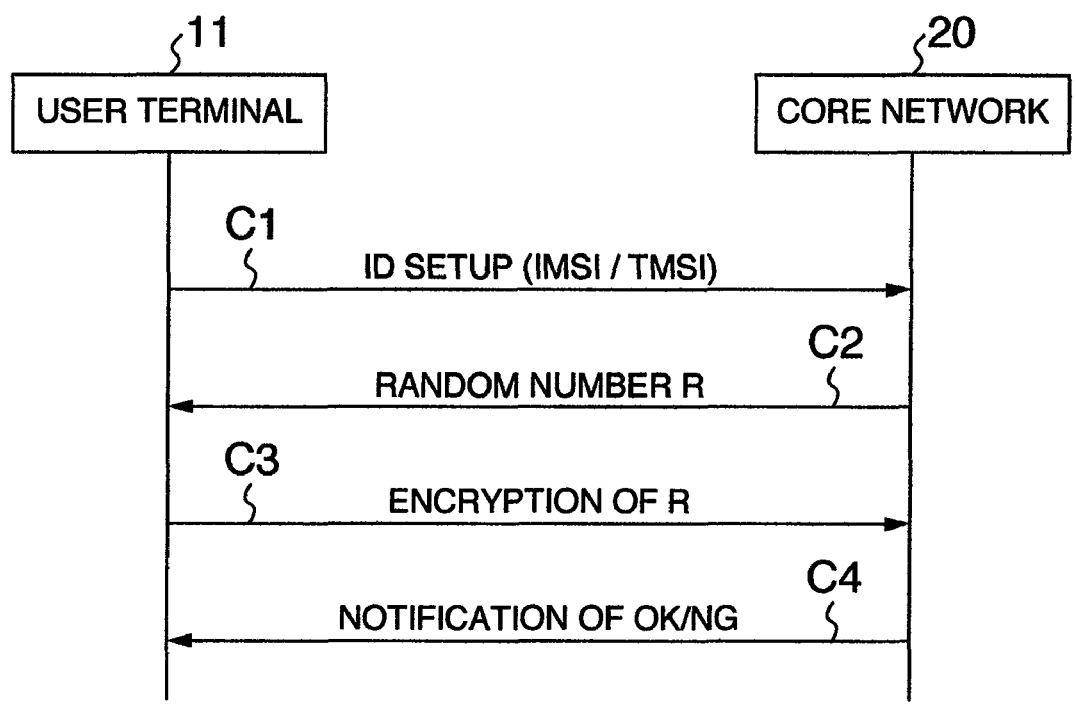
FIG. 4 shows a network authentication protocol used in the embodiment in practice of this invention shown in FIG. 1.

Then, the user turns on the power switch of his/her terminal while depressing the registration button (Step A3). As a result, the user terminal information is sent out to the base station. At this time, such protocol processing for the access to the core network as shown in detail in FIG. 4 is performed by, for example, the MSC 21 or the HSS 23 incorporated in the core network 20 shown in FIG. 5, the MSC 21 or the HSS 23 being regarded here as an upper device relative to the base station. Consequently, the network authentication process is initiated (Step A4). Such protocol processing for the access to the core network as shown in FIG. 4 will be described in detail later.

The authentication of the accessing user terminal is performed through the core network access protocol processing that compares the information on the accessing terminal with the corresponding subscriber information stored in the the HSS 23 on the core network 20, and the location of the accessing user terminal is registered in the visitor location register 22. At this time, the process of setting up the access right is also performed.

Figure 2:
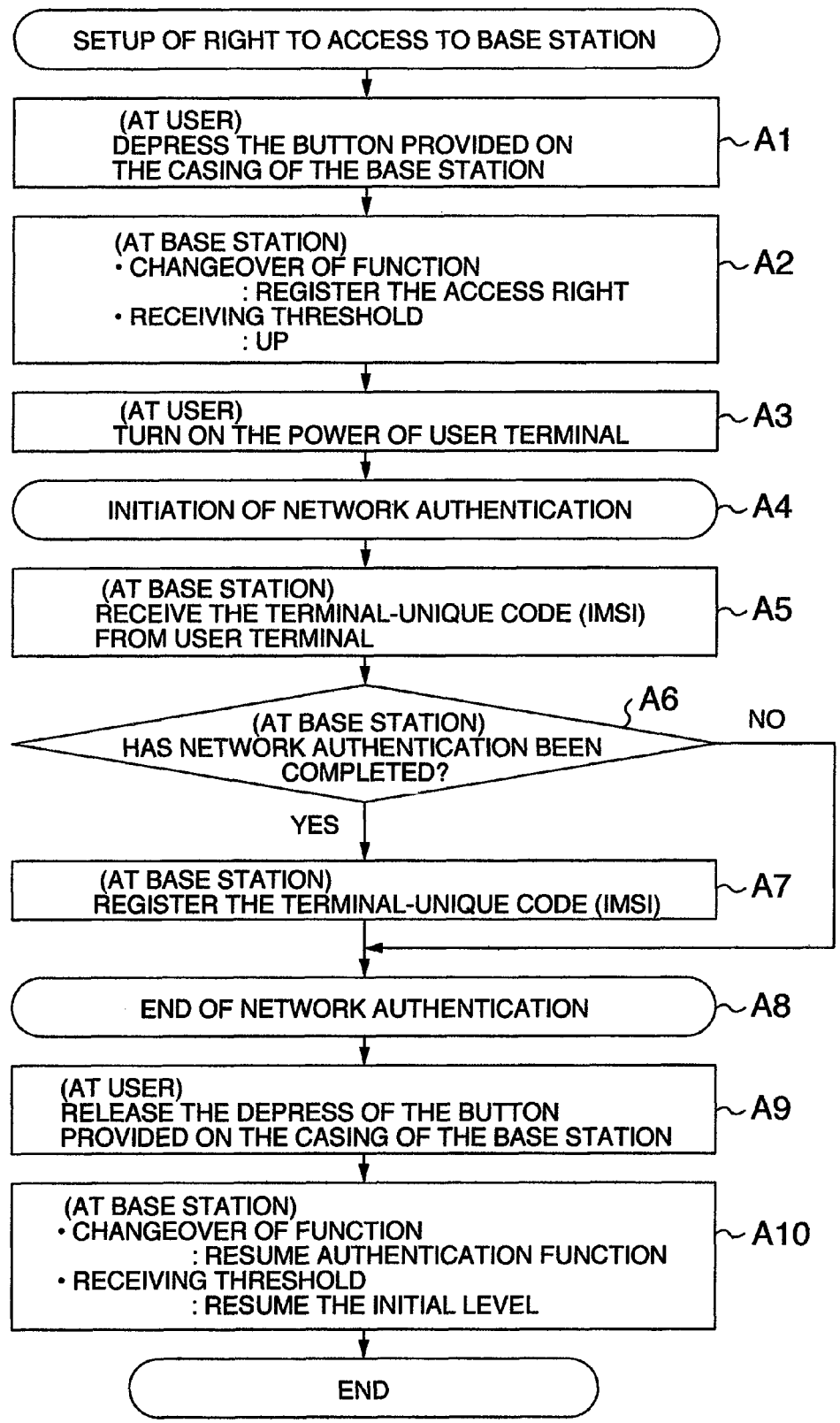
FIG. 2 is a flow chart for the process of setting up the access right by the base station device according to the embodiment in practice of this invention shown in FIG. 1.

The base station receives a mobile unique code or the IMSI (international mobile subscriber identity) from the accessing user terminal as indicated in Step A5 in FIG. 2. The received IMSI is then subjected to demodulation and error correction in the uplink baseband processing unit 62. The demodulated and error-corrected output is delivered through the frame processing unit 63 and the changeover switch 65 to the access right setup unit 67. The access right setup unit 67 then judges whether or not the network authentication has been completed (Step A6). If the network authentication has been completed, then the access right setup unit 67 registers the IMSI in the authentication memory (not shown) (Step A7) so that the network authentication process ends (Step A8). On the other hand, If the judgment in Step A6 is that the network authentication failed in being completed, the network authentication process ends without registering the IMSI (Step A8).

At the time of setting up the access right, it is naturally expected that the condition of radio channels, i.e. radio wave propagation medium, in the vicinity of the base station is favorable. The user terminal whose access right has been set up is regarded as being outside radio link when the network authentication failed, and as being within radio link when the network authentication was successfully completed, with the levels of communication availability being displayed on the screen of the user terminal. Accordingly, the user can recognize the successful connection with the network and the completion of the setup of the right to access to the base station by observing the levels of communication availability displayed on his/her terminal.

After having ascertained that the network authentication was completed, judging from the displayed level of communication availability, the user releases the depression of the registration button on the casing of the base station (Step A9). Accordingly, the changeover switch 65 is flipped from the selection of the access right setup unit 67 to the selection of the authentication unit 66. As a result of this, the access right setup unit 67 causes the reception sensitivity or the receiving threshold, of the uplink baseband processing unit 62 to be returned to the original level (Step A10), and the process of setting up the right to access to the base station ends.

Also, a similar procedure is executed in the additional setup of the right to access of another user terminal to the base station.

Figure 3:
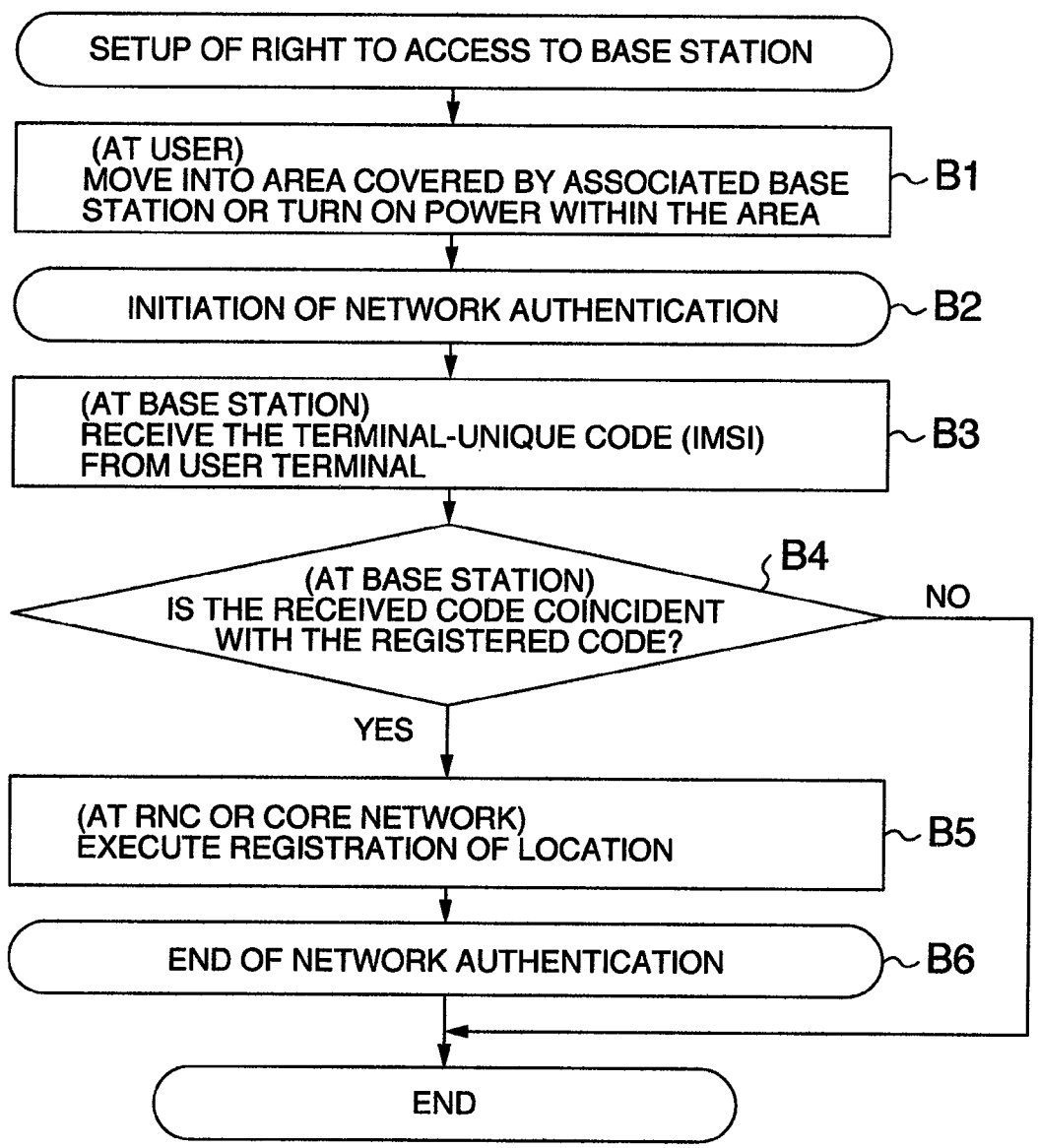
FIG. 3 is a flow chart for the process of authenticating the access of user terminals to the base station device according to the embodiment in practice of this invention shown in FIG. 1.

Now, the process of authenticating the additional user terminal with its access right having been set up will be described with reference to the flow chart shown in FIG. 3.

When a user moves into the area covered by a base station with his/her terminal powered on, or when the user turns on the power of the terminal after the terminal moved into the area (Step B1), the base station initiates the process of network authentication (Step B2).

The base station receives the IMSI from the user terminal, and the received IMSI is then subjected to demodulation and error correction in the uplink baseband processing unit 62 (Step B3). The demodulated and error-corrected output is delivered through the frame processing unit 63 and the changeover switch 65 to the authentication unit 66. The authentication unit 66 compares the IMSI sent from the user terminal with the IMSI registered in the authentication memory (not shown) at the time of setting up the access right of the user terminal (Step B4).

In Step B4, if the authentication unit 66 recognizes the coincidence between the IMSI sent from the user terminal and the IMSI registered in the authentication memory, it turns on the switch 64 for connection with the upper device so that the location registration for the user terminal is performed in the upper device (Step B5). Then, the process of network authentication ends (Step B6). If, on the other hand, the authentication unit 66 does not recognize the coincidence between the IMSI sent from the user terminal and the IMSI registered in the authentication memory, it turns off the switch 64, judging that the user terminal does not have the access right, and controls the downlink and uplink base band processing units 52 and 62 so that connection with the upper device may not be made.

Some network systems are provided with a response channel for rejecting access of a user terminal to the base station. In such circumstances, the response of access rejection may be made through the use of the response channel in the processing of the downlink signal.

In the above described embodiment in practice of this invention, the process of network authentication has been executed by using the IMSI sent from the user terminal in the setup of the right to access of the user terminal to the base station and the authentication of the access right. However, the network authentication may also be performed by using the ID number (TMSI: temporary mobile subscriber identity) which can be used in place of the IMSI for improved security.

Description is made of a network authentication protocol in reference to FIG. 4.

When accessing the core network 20, the user terminal 11 transmits to the core network 20 the IMSI or the ID number used in place of the IMSI for improved security so as to demand authentication and location registration (Step C1). In this case, the transmission of the information from the terminal 11 to the core network 20 is through the base station 12 and the RNC 14 as shown in FIG. 5.

The core network 20 obtains from the HSS 23 the encryption key for authentication that corresponds to the ID number (IMSI/TMSI) of the terminal 11, generates a certain random number R for network authentication, and sends the random number R back to the terminal 11 (Step C2).

The terminal 11 then refers to the USIM (universal subscriber identity module) card incorporated therein, generates an encryption key for authentication, encodes the random number R with this encryption key for authentication, and sends back the encoded signal to the core network 20 (Step C3).

The core network 20 encodes the same random number R as transmitted to the terminal 11 with the encryption key obtained from the HSS 23, and compares this encrypted random number R with the encrypted random number R sent back from the terminal 11. If they are coincident with each other, authentication is successful so that the core network 20 transmits a signal "OK" to the terminal 11. If they are not coincident, a signal "NG" is transmitted to the terminal 11 (Step C4). Further, if authentication is successful, the core network 20 registers the location of the terminal 11 in the visitor location register 22.

According to the above described embodiment in practice of this invention, the right to access of a user terminal to the associated base station can be set up in the base station by providing the base station with the function of setting up the right to access of the user terminal to the base station and the function of authenticating the user terminal having the right to access to the base station. Consequently, accesses to the base station from unauthorized user terminals other than the authenticated user terminal are rejected, with the result that the intended user terminal alone can access the base station. Thus, the base station has a great advantage when used as a base station for a small-scale home use which only a limited number of users can use.

When the change over switch 65 in the base station is flipped from the authentication unit 66 to the access right setup unit 67, the access right setup unit 67 controls the uplink baseband processing unit 62 so as to decrease the reception sensitivity or to increase the receiving threshold at the base station so that the communication environment can be set up where only user terminals located near the base station can communicate with the base station. Thus, the erroneous authentication of unregistered, unintended user terminals can be avoided without fail when they attempt to access the base station.

In the third generation mobilephone system shown in FIG. 5, the RNC 14, which is the upper device relative to the base station 12, sometimes receives the encryption key (authentication key) from the HSS 23 and stores it. In such a case where the RNC 14 holds the authentication key and in such a system wherein the function of the RNC 14 is incorporated in the base station 12, the encryption key may be registered for authentication of the access to the base station 12.

Although, in the above described embodiment in practice of this invention, the authentication of access to the base station is performed by using the ID numbers (IMSI/TMSI) of user terminals, the access authentication may also be performed by using such data unique to users as, for example, telephone numbers, previously registered in the base station. Further, in the communication system wherein the unique data registered in the base station are encrypted and the encryption code is varied for higher security, the encryption code as it is does not serve as unique data so that it cannot be used for authentication at the base station. However, if the function of decrypting the encrypted code, which is performed in the upper process, is installed in the access right setup unit 67 and the authenticating unit 66, then the encrypted code can be decrypted and obtained as unique data. Accordingly, by registering the thus obtained unique data in the base station, the setup of the right to access to the base station and the authentication of the access right can be effectuated.

Further, in the above described embodiment in practice of this invention, the changeover switch 65 for toggling between the setup of the right to access to the base station and the authentication of the access right, selects the access right setup unit 67 only while the registration button provided on the casing of the base station is being depressed, and when the button is released, the initial condition is resumed, that is, the authenticating unit 66 is selected. In an alternative configuration, however, the changeover switch 65 may toggle back and forth between the authenticating unit 66 and the access right setup unit 67 each time the registration button is depressed. In a variation of this configuration, the changeover switch 65 may be manually actuated to select the access right setup unit 67 at the time of setting up the access right and thereafter automatically driven back to select the authenticating unit 66 at the time of completing the process for setting up the access right, that is, at the time of detecting the end of the network authentication process in, for example, Step A8 in FIG. 2.

Moreover, in the above described embodiment in practice of this invention, the registration button provided on the casing of the base station controls the toggling operation of the changeover switch 65 at the time of setting up the access right. In an alternative configuration, however, the registration button is eliminated and the changeover switch 65 may be directly manipulated.

Furthermore, in the above described embodiment in practice of this invention, the changeover switch 65 is toggled back and forth between the authenticating unit 66 and the access right setup unit 67 by the actuation of the registration button provided on the casing of the base station. By way of example of an alternative configuration, an internal register for changeover between the mode of setting up the access right and the mode of authentication may be provided in the base station, and the content of the internal register may be rewritten, according to the instruction from the personal computer connected with the base station, in order to changeover between the mode of setting up the access right and the mode of authentication.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A base station device capable of setting an access right to a mobile terminal, comprising:
   a wireless signal processing unit for wirelessly communicating with the mobile terminal via an antenna for transmission and reception;
   a downlink signal frame processing unit for frame processing of a downlink signal transmitted from a wireless control device as an upper device;
   a downlink baseband processing unit for adding a parity bit for error correction to the signal processed by the downlink signal frame processing unit and modulating the added signal;
   a digital to analog (D/A) converter for converting the signal, as a digital signal, processed by the downlink baseband processing unit into an analog signal and outputting the analog signal to the wireless signal processing unit;
   an analog to digital (A/D) converter for converting a signal, from the mobile terminal, received and processed by the wireless signal processing unit via the antenna for transmission and reception into a digital signal;

an uplink baseband processing unit for demodulating the digital signal converted by the A/D converter and processing the demodulated signal for error correction;

an upper signal frame processing unit for frame processing of the received signal, from the mobile terminal, processed by the uplink baseband processing unit;

an upper connection switch for turning on/off, according to an authorization result, the signal from the upper signal frame processing unit to the wireless control device as the upper device;

an authorization unit for authorizing the mobile terminal;

an access right setting unit for setting the access right to the mobile terminal; and a changeover switch for switching to the authorization unit or the access right setting unit and inputting a part of the signal processed by the upper signal frame processing unit.

2. The base station device according to claim 1, wherein if the changeover switch changes to the access right setting unit, the access right setting unit sets the access right based on the signal processed by the upper signal frame processing unit.

3. The base station device according to claim 1, wherein if the changeover switch changes to the access right setting unit, the access right setting unit controls the upper baseband processing unit for raising or lowering a receiving sensitivity.

4. A method for setting up an access to a base station device, the method having a normal communication mode for normally communicating a mobile terminal with the base station device and an access privilege registration mode for registering an access privilege from the mobile terminal to the base station device, comprising the steps of:

switching from the communication mode to the access right registration mode;

increasing a reception threshold level of the base station device or decreasing a reception sensitively of the base station device when in the access privilege registration mode;

bringing the mobile terminal into a communication area of the base station device when in the access right registration mode;

registering a unique code of the mobile terminal into the base station device when in the access right registration mode;

bring the registered motile terminal out of the communication area of the base station device;

switching back from the access right registration mode to the communication mode; and resuming back the reception threshold level or the reception sensitively of the base station device.

5. The method according to claim 4, wherein, when an unregistered mobile terminal, which is not registered in the base station device, accesses to the base station device, the unregistered mobile terminal is rejected to access to the base station device.

* * * * *